United States Patent [19]

Barbará et al.

[11] Patent Number: 5,706,435
[45] Date of Patent: *Jan. 6, 1998

[54] SYSTEM FOR MAINTAINING DATA COHERENCY IN CACHE MEMORY BY PERIODICALLY BROADCASTING A SINGLE INVALIDATION REPORT FROM SERVER TO CLIENTS

[75] Inventors: Daniel Barbará, Princeton; Tomasz Imielinski, North Brunswick, both of N.J.

[73] Assignee: Panasonic Technologies, Inc., Princeton, N.J.

[*] Notice: The term of this patent shall not extend beyond the expiration date of Pat. No. 5,581,704.

[21] Appl. No.: 687,689

[22] Filed: Jul. 26, 1996

Related U.S. Application Data

[63] Continuation of Ser. No. 163,335, Dec. 6, 1993, Pat. No. 5,581,704.

[51] Int. Cl.[6] .................................................. A06F 13/00
[52] U.S. Cl. ........................... 395/200.09; 395/200.12; 395/460; 395/471; 395/865; 395/872
[58] Field of Search ..................... 395/200.09, 608, 395/200.01, 200.12, 460, 471, 865, 872; 375/362; 340/855.4

[56] References Cited

U.S. PATENT DOCUMENTS

| | | | |
|---|---|---|---|
| 3,723,976 | 3/1973 | Alvarez et al. | 395/417 |
| 3,771,137 | 11/1973 | Barner et al. | 395/447 |
| 4,984,153 | 1/1991 | Kregness et al. | 395/479 |
| 5,113,514 | 5/1992 | Albonesi et al. | 395/471 |
| 5,121,126 | 6/1992 | Clagett | 342/419 |
| 5,134,697 | 7/1992 | Scheffler | 395/497.02 |
| 5,142,550 | 8/1992 | Tymes | 375/206 |
| 5,146,603 | 9/1992 | Frost et al. | 395/470 |
| 5,175,851 | 12/1992 | Johnson et al. | 395/608 |
| 5,179,675 | 1/1993 | Cole et al. | 395/403 |
| 5,185,878 | 2/1993 | Baror et al. | 395/450 |
| 5,197,139 | 3/1993 | Emma et al. | 395/417 |
| 5,210,848 | 5/1993 | Liu | 395/451 |
| 5,212,806 | 5/1993 | Natarajan | 455/33.2 |
| 5,249,268 | 9/1993 | Doucet | 395/200.01 |
| 5,255,291 | 10/1993 | Holden et al. | 375/362 |
| 5,265,235 | 11/1993 | Sindhu et al. | 395/447 |
| 5,331,318 | 7/1994 | Montgomery | 340/855.4 |
| 5,355,471 | 10/1994 | Weight | 395/182.08 |
| 5,404,483 | 4/1995 | Stamm et al. | 395/471 |
| 5,426,747 | 6/1995 | Weinreb et al. | 395/413 |
| 5,557,792 | 9/1996 | Josten et al. | 395/608 |
| 5,581,704 | 12/1996 | Barbara et al. | 395/200.09 |

OTHER PUBLICATIONS

T. Imielinski et al., "Data Dissemination in Wireless and Mobile Environments", Published in Technical Report 59, Winlab, Rutgers University, Jun. 1993.

(List continued on next page.)

*Primary Examiner*—Thomas C. Lee
*Assistant Examiner*—Le Hien Luu
*Attorney, Agent, or Firm*—Ratner & Prestia

[57] ABSTRACT

A method and system are provided for maintaining coherency between a server processor and a client processor that has a cache memory. The server may, for example, be a fixed location mobile unit support station. The client may, for example, be a palmtop computer. The server stores a plurality of data values, and the client stores a subset of the plurality of data values in the cache. The server processor periodically broadcasts invalidation reports to the client processor. Each respective invalidation report includes information identifying which, if any, of the plurality of data values have been updated within a predetermined period of time before the server processor broadcasts the respective invalidation report. The client processor determines, based on the invalidation reports, whether a selected data value in the cache memory of the client processor has been updated in the server processor since the selected data value was stored in the cache memory. The client processor invalidates the selected data value in the cache memory of the client processor, if the selected data value has been updated in the server processor.

11 Claims, 7 Drawing Sheets

OTHER PUBLICATIONS

T. Imielinski et al., "Querying in highly mobile distributed environments", Published in Proceedings of the Eighteenth International Conference on Very Large Databases, Vancouver, Aug. 1992.

Tom Madej, "An Application of Group Testing to the File Comparison Problem", IEEE, at pp. 237–243 (1989).

D. Barbara et al., "A Class of Randomized Strategies for Low Cost Comparison of File Copies", IEEE Transactions on Parallel and Distributed Systems, vol. 2, No. 2, (Apr. 1991).

W. Kent Fuchs et al., "Low–Cost Comparison and Diagnosis of Large Remotely Located Files;, Proceedings of the Fifth Symposium on Reliability of Distributed Software and Database Systems", Jan. 1986.

Sampath Rangarajan et al., "Optimal Remote File Comparison in Replicated File Systems", Unpublished, Date prior to Nov. 12, 1993.

S. Rangarajan et al., "Rectifying Corrupted Files in Distributed File Systems", Published in Proceedings of the 11th International Conference on Distributed Systems, May 1991.

Blaze et al, "Dynamic Hierarchical Caching in Large–Scale Distributed file Systems", 1992, pp. 521–528.

"Cache Invalidation Patterns in Shared–Memory Multiprocessors", Jul. 1992, pp. 794–810.

Hwang, "CSE552, Advanced Computer Architecture Local Knowledge Cache Coherence", 1993, pp. 1–3.

SYSTEM FOR MAINTAINING DATA COHERENCY IN CACHE MEMORY BY PERIODICALLY BROADCASTING A SINGLE INVALIDATION REPORT FROM SERVER TO CLIENTS

This application is a continuation of application Ser. No. 08/163,335, filed Dec. 6, 1993, now U.S. Pat. No. 5,581,704.

FIELD OF THE INVENTION

The present invention relates generally to the field of cache memories, and in particular to cache memory management strategies for distributed computing environments.

BACKGROUND OF THE INVENTION

A cache memory is a memory that is packaged as an integral component of a processing unit in a computer system. The cache is generally much smaller than main memory. Its purpose is to serve as a buffer between the processors and the memory, emulating the main memory, but with a much faster access time.

For multiprocessor systems, the cache management strategy also includes algorithms that provide a coherent view of storage to all of the processors in the system. Coherency implies that store operations to a memory location performed by a given processor (e.g., a server) will be made consistent with fetch operations done to the same memory location by another processor (e.g., a client). Coherency provides a means for determining when cached data in a given processor becomes obsolete as a result of store operations performed by another processor.

In the Andrew file system, for example, the server maintains a record of which data is cached in each of the clients. Typically, coherency is maintained by providing a valid bit for each datum in each respective client's cache. A "cross invalidate" (XI) is the act of invalidating, or marking non-resident, a line in the cache of a remote processor. When a server needs to change the value of a datum, the server broadcasts XI messages to all of the other processors that may have a copy of the same datum in cache. If a copy of the datum is present in one of these other caches, that copy is marked invalid (e.g., the valid bit is reset) in response to the XI. Only after all copies are marked invalid does the first processor change the target data value. A request for the datum then results in a cache miss.

In the Network File System, the server does not have to keep track of which clients have copies of each respective datum. Whenever a client needs to access data in its respective cache, it queries the server to verify that its copy of the data is current.

The paradigms described above work well when all of the processors in the system are active at the same time, and when the communications paths between the processors are static. Typically, this has been the case when all of the processors are collocated and are operated continuously.

The introduction of wireless cellular communications and palmtop computers into the marketplace introduces new capabilities and also poses new technical challenges. The need to share data in this distributed and mobile environment presents one of these challenges. It is desirable to share data among fixed location mobile unit support stations and mobile palmtop units.

The conditions in a mobile wireless computing environment differ from those encountered in the static, collocated multiprocessor systems described above. In the mobile environment, a large number of users equipped with low powered palmtop machines may query databases over wireless communications channels. Palmtop units are often powered down (taken off-line) for prolonged periods of time to conserve battery energy. Thus, if palmtops are equipped with caches, the palmtops may not always be available to receive cross invalidate messages from the mobile unit support stations, if such messages are sent.

Furthermore, the palmtop users do not maintain fixed or universally known positions in the wireless network. A given palmtop unit may be in communication with different mobile unit support stations at different times. The mobile unit support stations cannot predict which palmtop units will be within their respective radio coverage areas at any given time.

Although the mobile unit support stations may be located in proximity to one another, for example, within a single building or campus, it is contemplated that palmtop machines will also communicate over conventional cellular communications networks as well. In the latter case, the communications bandwidth may be limited (e.g., 10 to 20 kilobits per second). The bandwidth places a limit on the number of queries to which the server can respond in a given period of time. Because of the limited bandwidth in the cellular environment, it is impractical for each palmtop to query the mobile unit support station for a complete database refresh each time the palmtop user wishes to access data after returning to the on-line state. The mobility of the palmtops, their frequent unavailability to receive XI messages, and communications bandwidth limitations make caching of data within the palmtops by the conventional paradigms difficult.

The above identified factors tend to make communications with palmtop machines more complex. At the same time, some of the constraints that have driven the design of many prior art systems may not apply in some of the applications for palmtop computers. For example, palmtops may be used by consumers to access data that are updated with a frequency that is much smaller than the frequency of queries sent from the clients to the server. Additionally, some palmtop applications may tolerate a small, known probability that the data in the palmtop are considered to be current when in fact the data have been updated (For example, when updates are infrequent and are minor). For such applications, the prior art cache management strategies for distributed systems may be inefficient.

An improved method for maintaining a coherent view of the data in the cache of each mobile unit is desired. Desirably, the improved method would not require the mobile units to stay on-line at all times, and would not require a full cache refresh each time a mobile unit is turned on.

SUMMARY OF THE INVENTION

The invention is a method and system for maintaining coherency between a server processor and a client processor that has a cache memory. The server stores a plurality of data values, and the client stores a subset of the plurality of data values in the cache.

The server processor periodically broadcasts invalidation reports to the client processor. Each respective invalidation report includes information identifying which, if any, of the plurality of data values have been updated within a predetermined period of time before the server processor broadcasts the respective invalidation report.

The client processor determines, based on the invalidation reports, whether a selected data value in the cache memory of the client processor has been updated in the server processor since the selected data value was stored in the cache memory. The client processor invalidates the selected data value in the cache memory of the client processor, if the selected data value has been updated in the server processor.

DETAILED DESCRIPTION

OVERVIEW

Figure 1:
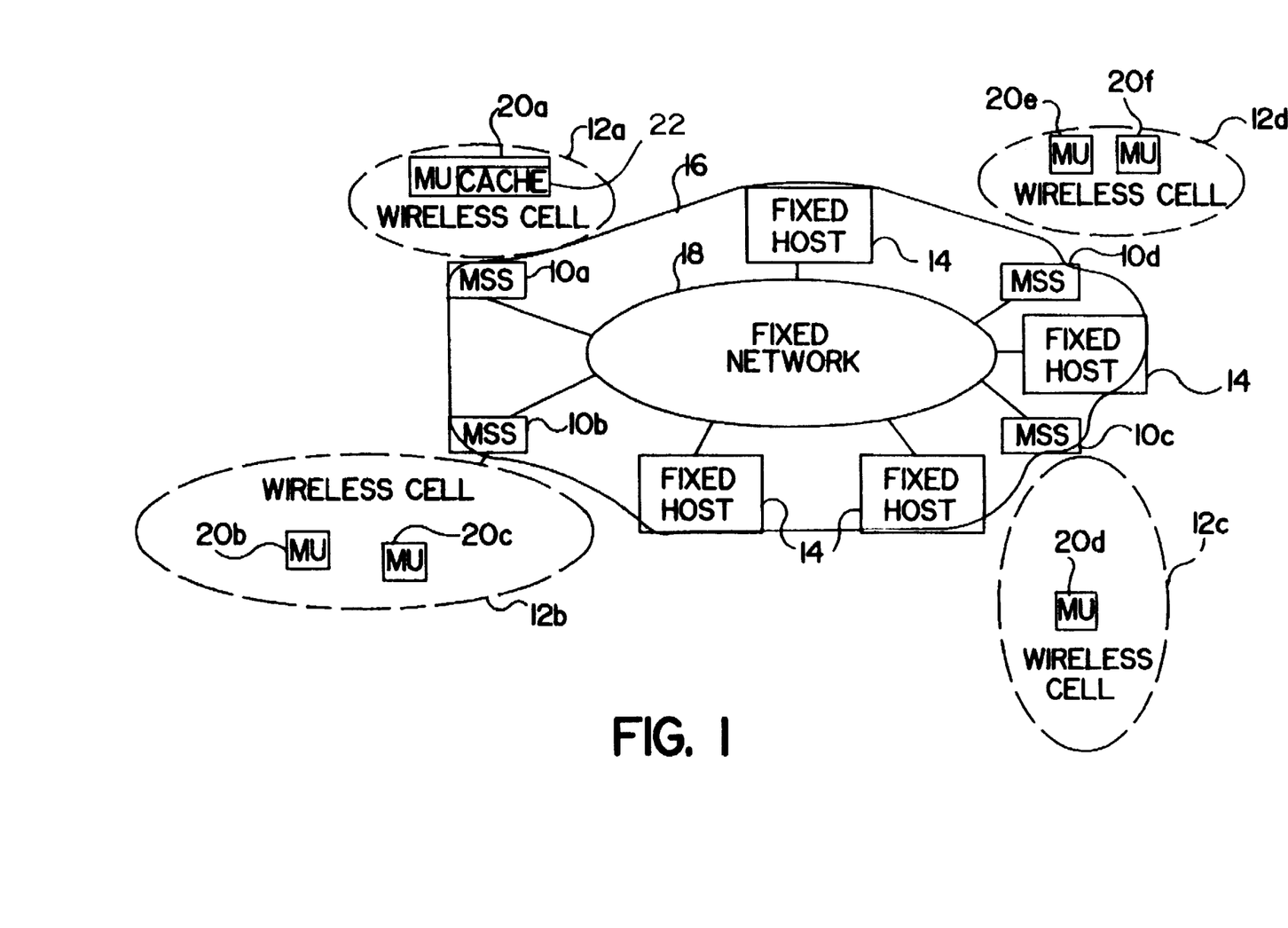
FIG. 1 is a block diagram of an exemplary system in accordance with the invention.

FIG. 1 is a block diagram of an exemplary system in accordance with the invention, for maintaining coherency between data stored in one or more server processors 10a–10d and one or more client processors 20a–20f. The invention may be used advantageously in an environment in which the clients are taken off-line part of the time and are not available to receive invalidation messages at all times. The invention also may be used advantageously in environments in which the frequency of data updates by the server 10a–10d is much less than the frequency of queries by the clients 20a–20f.

Each server 10a–10d stores a plurality of data values. The servers 10a–10d all have access to a common body of data. The servers 10a–10d may, for example, include databases covering a variety of subjects, such as financial data, news, weather, documents, etc. Such data may be accessed by palmtop computers 20a–20f over a cellular network.

The servers 10a–10d are coupled via communications links to one or more client processors 20a–20f. Each of the clients 20a–20f has a respective cache memory 22 for storing a subset of the of the data that are stored in the servers 10a–10d. For simplicity, only one cache memory 22 in client 20a is shown in FIG. 1. The cache memories (not shown) in the remaining clients 20b–20f may be identical to cache 22. Any of the clients 20a–20f may store copies of any subset of the data in its respective cache 22. Therefore the contents of the caches 22 may differ.

In the exemplary embodiment, the servers 10a–10d are connected to each other by a fixed (i.e., stationary) network 18 and the couplings between the servers 10a–10d and the clients 20a–20f are wireless. The exemplary clients 20a–20f are mobile units (MU), such as palmtop computers. The exemplary servers 10a–10d are mobile unit support stations (MSS). Each MSS 10a–10d communicates within a respective radio coverage area called a cell 12a–12d. An MU 20a–20f may move between any of the cells 12a–12d.

Figure 2:
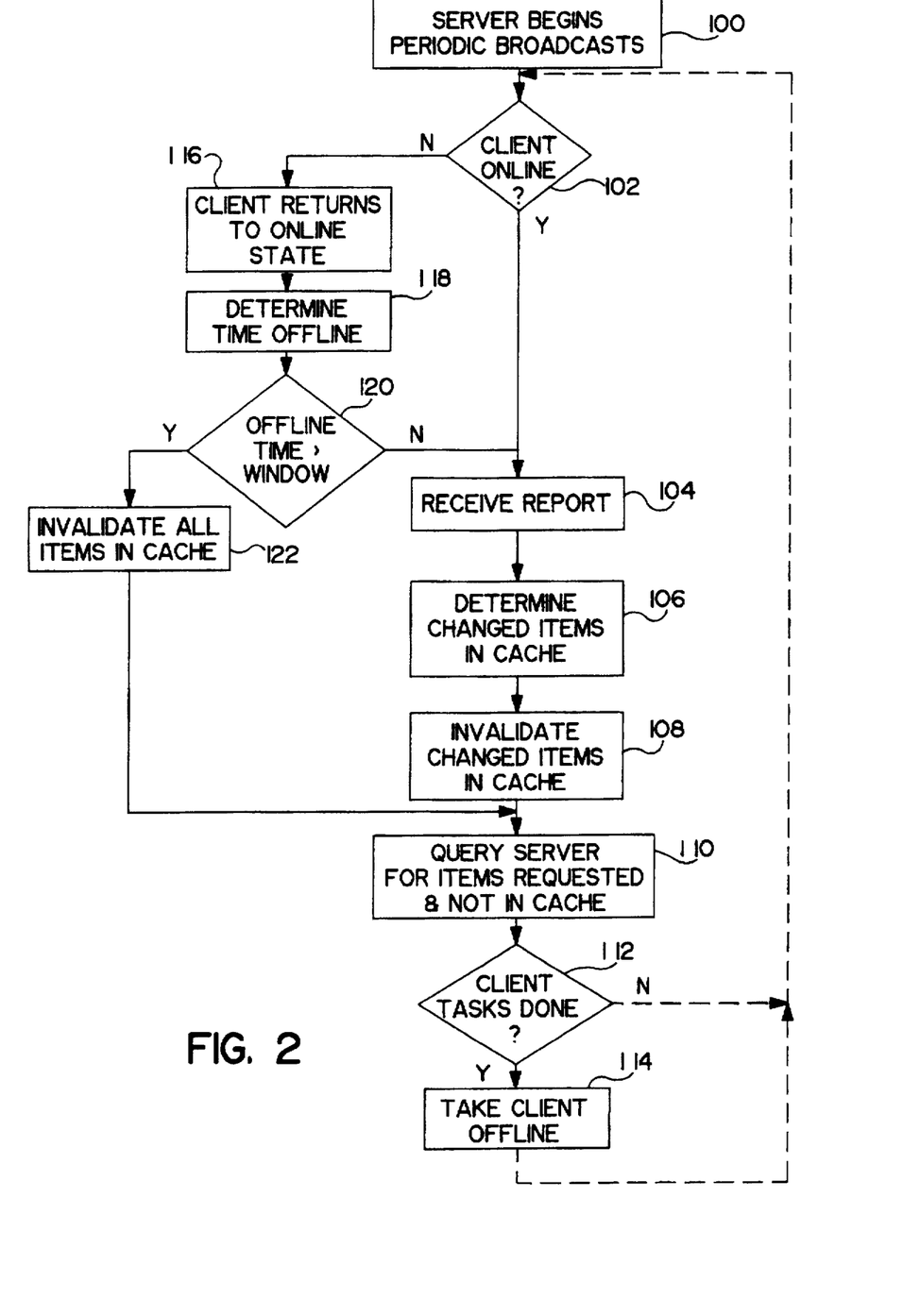
FIG. 2 is a flow chart diagram of a method for maintaining cache coherency in the system of FIG. 1.

FIG. 2 is a flow chart diagram showing an exemplary process according to the invention.

Each server 10a–10d includes a process for forming and broadcasting periodic invalidation reports to any of the clients 20a–20f currently located within its respective cell 12a–12d. At step 100, the server begins to periodically form and broadcast invalidation reports. Each invalidation report includes information identifying which of the data values stored in the server 10a–10d have been updated within a predetermined interval of time (hereinafter referred to as a window), before the server 10a–10d broadcasts that invalidation report. The period of the broadcasts may be the same as, or different from, the length of the window. For example, the window may be six to ten times as long as the period. The servers 10a–10d broadcast the reports over a wireless medium (e.g., radio frequency). The servers 10a–10d need not maintain records of which clients are located in each respective cell 12a–12d, or of the contents of the respective cache 22 of each client 20a–20f.

At step 104, each client 20a–20f receives the invalidation reports if the client is turned on and is in an on-line state. At step 106, based on the invalidation reports, each client 20a–20f determines whether any of the data in its respective cache memory 22 are copies of data that have been updated in the server 10a–10d since the time that the copies were stored in the cache 22. If so, then the copies of the data in the cache 22 are invalid. At step 106, the clients 20a–20f determine which data have been updated in the servers 10a–10d. Then at step 108, the clients 20a–20f mark these data invalid in the cache 22. At step 110, the clients 20a–20f query the respective servers 10a–10d for any requested data that are not present in cache 22.

According to an advantageous aspect of the invention, the clients 20a–20f may be taken off-line at any time. For example, if clients 20a–20f are palmtop computers, the clients 20a–20f may be carried around by the operators from one location to another (and perhaps from one cell 12a–12d to another). The palmtop computers may not always be needed. When a palmtop computer is not needed (step 112), it may be taken off-line at step 114 to conserve battery power.

At steps 116–120, the clients 20a–20f may update their caches in response to the invalidation reports received after returning to an on-line state, even though the clients 20a–20f miss some of the invalidation reports when the clients 20a–20f are off-line. The invalidation reports contain "cumulative" information sufficient to enable the clients 20a–20f to determine all data that have been invalidated during the window time. This may be accomplished so long as the off-line time does not exceed the window time at step 120. If the off-line time does exceed the window time at step 120, then all items in the cache are invalidated at step 122.

If the invalidation report does not indicate that a datum is invalid, and the client has not been off-line for a time greater than the window, then the data in the client's cache 22 are presumed by the client to be valid as of the time the invalidation report is broadcast. Note that some latency is introduced into the query process when the clients 20a–20f wait for the report. In between reports, a datum may be updated in the server 10a–10d; the clients 20a–20f are not notified until the next report is broadcast. Thus the period between validation reports is selected to be small enough, relative to the update frequency, so that the risk of using "stale" data in between reports is reduced to an acceptable level.

The method shown in FIG. 2. may reduce the number of queries that each client 20a–20f must make to refresh its cache after a request for data. By reducing the number of queries, the traffic loading between the servers 10a–10d and the clients 20a–20f is reduced, and it is possible to serve a greater number of clients 20a–20f, or handle a larger database in the server 10a–10d.

According to another aspect of the invention, the clients 20a–20f accept invalidation reports from any of the servers 10a–10d when the clients are located within the respective cells 12a–12d of those servers 10a–10d. Upon return to an on-line state, the client 20a–20f accepts the next invalidation report broadcast by the nearest server 10a–10d, determines which data in the cache 22 are invalid based on the invalidation report, and invalidates any of the data in the cache 22 that the client 20a–20f determines to be invalid.

Another exemplary application for the invention is in a retail store, such as a supermarket. Consumers may carry portable devices throughout the store. These portable devices may be equipped with scanners (e.g., optical or magnetic scanners) for reading product labels. The devices scan the product labels, query the server for the prices, and store the prices in cache. The consumers may use the stored prices to compute the total cost of an order of goods. This is an example of a query intensive environment, in which the server may only update a given price once per day or once per week, but the clients query the server many times per hour.

THE EXEMPLARY EMBODIMENTS

The invention may be implemented in many different ways, including but not limited to the exemplary embodiments, described below. The contents and frequency of the invalidation reports, and the response of the client processors upon receipt of the reports is selected based on the nature of the environment. The goal of selecting a particular strategy is to limit the number of queries from the client processors in a given time interval to a number less than the maximum number of queries that may be satisfied by the server in that interval. Specific factors that may be considered in defining the strategy include the frequency of updates to the data, the frequency of queries, and the fractional time that each client is in the on-line state.

One extreme end of the spectrum is the environment in which updates are very frequent relative to queries. In such a situation, the cache hit ratio is expected to be very low, regardless of which method for maintaining cache coherency. In such an environment, the use of a cache in each client may not be efficient. That is, performance may be much the same regardless of whether a cache is included in the client configuration. The invention is most effective at the other end of the spectrum (when updates are infrequent and requests for data are frequent, so that the cache hit ratio is high).

Three alternative strategies for defining the contents of the invalidation reports are described below. Each of the strategies may provide better system performance (defined by the number of queries to which the server 10a can respond per unit of time) in a respectively different environment. For each respective strategy described below, the environment in which that strategy may be preferred is described.

Figure 3A:
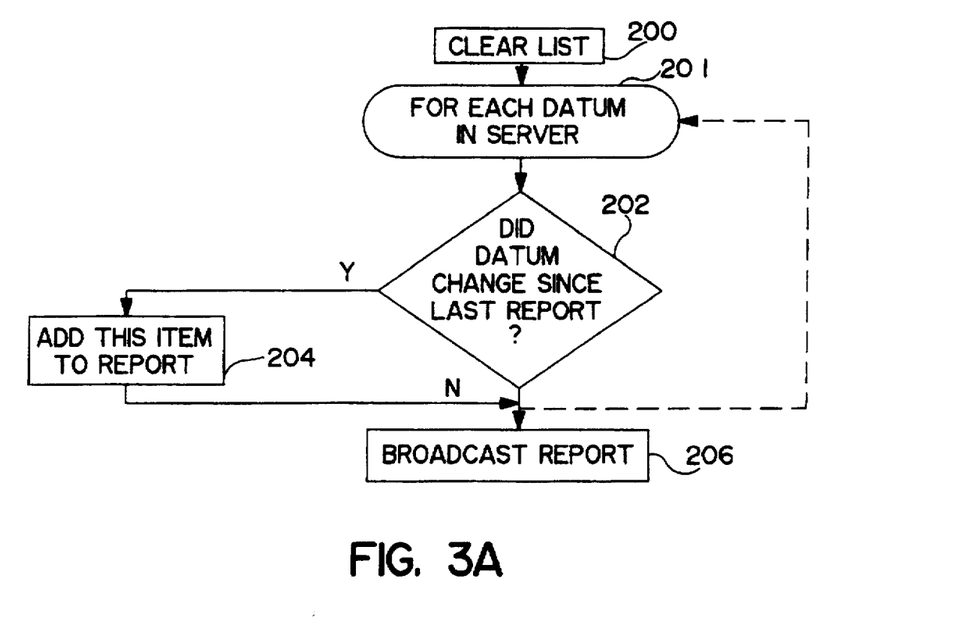
FIG. 3A is a detailed flow chart diagram of an exemplary method for forming and broadcasting invalidation reports as shown in FIG. 1.
Figure 3B:
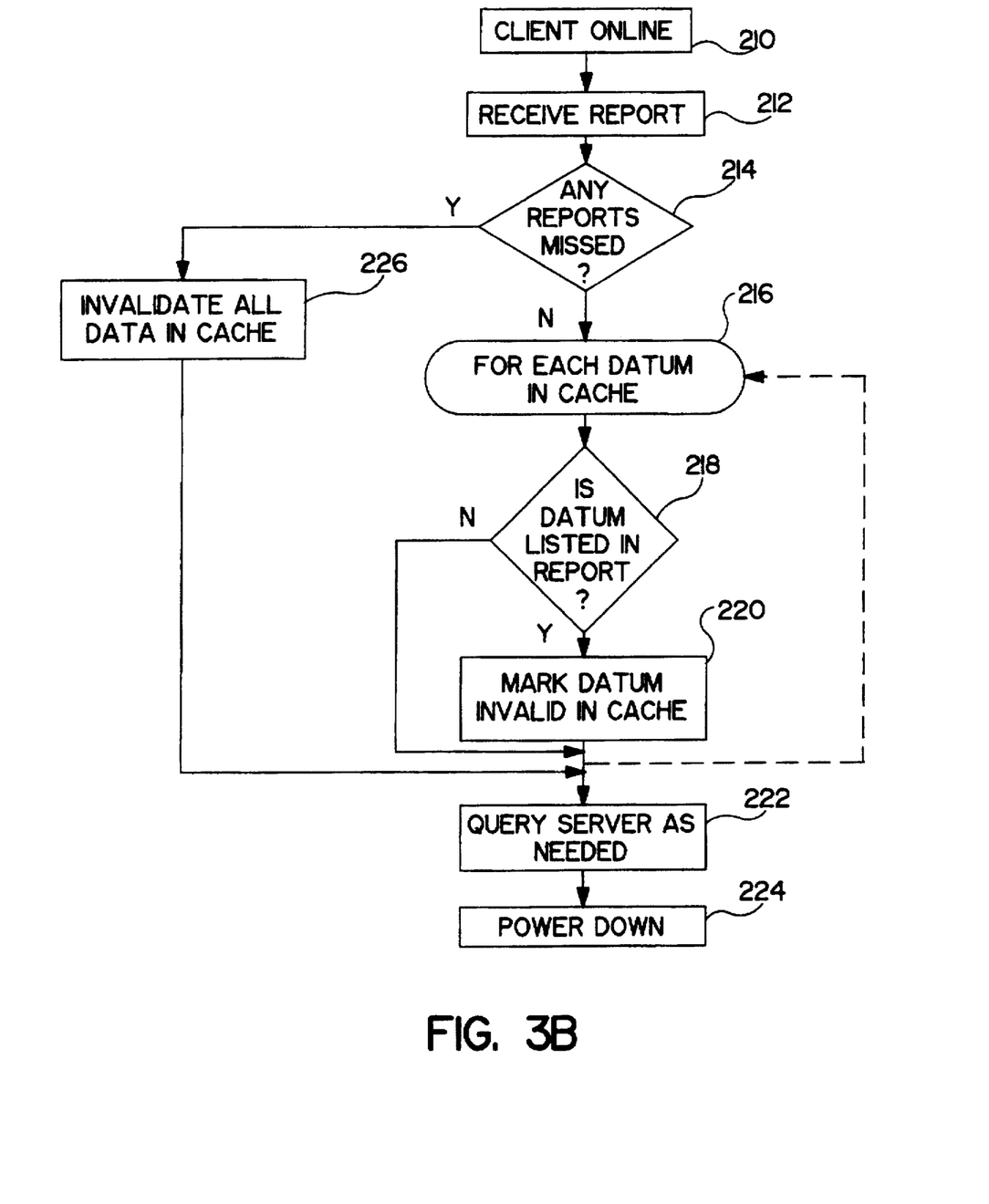
FIG. 3B is a flow chart diagram of an exemplary method for processing the invalidation reports produced by the method shown in FIG. 3A.

The inventors have determined that the first exemplary embodiment provides the greatest throughput when the client processors 20a–20f are on-line all, or nearly all of the time (In other words, if the time on-line is several times greater than the time off-line). This exemplary embodiment is referred to herein as "Broadcasting Addresses", and is shown in FIGS. 3A and 3B. In this embodiment, the servers 10a–10d store a list of the addresses of each respective datum that has been updated since the last invalidation report was broadcast. The clients 20a–20f invalidate the items on the list. A client 20a invalidates every datum in its cache 22 if it has missed one or more reports, as explained in detail below.

FIG. 3A is a flow chart diagram of the process executed by the server 10a to create and broadcast the invalidation reports. At step 200, the list of updated data is cleared. At steps 201 and 202, each of the data in the server 10a that is shared with the clients 20a–20f is checked to determine whether the datum has been updated since the last invalidation report. At step 204, if an item has been updated, the address of that datum is added to the list. At step 206, after each datum is checked, the report is broadcast to the clients. The report only includes the list of addresses. This method results in a very short invalidation report. This minimizes the fraction of the available bandwidth used for transmitting invalidation reports, and allows the server to broadcast responses to more queries.

FIG. 3B is a flow chart diagram of the process executed by the client 20a when it receives the invalidation report created by the process shown in FIG. 3A. At step 210, the process begins when the client is on-line, either continuously or after a period of off-line status. At step 212, the client 20a receives the next invalidation report broadcast from the server 10a. Then, at step 214, the client determines whether any reports have been missed, based on the time that the last report was received by the client. The period of the reports is a predetermined time interval that is known to the clients (Alternatively, the period of the reports or the time of the last prior report may be included as an item in the report). Thus, the client 20a can determine whether any reports were sent from the server 10a and not received by the client 20a.

In the first exemplary embodiment of the invention, if the client determines that one or more reports have been missed at step 214, then every entry in the cache 22 is invalidated at step 226. Steps 216 to 220 are repeated for each valid datum in the cache, if the client has not missed any reports at step 214. At step 218, for each datum in the cache 22, the invalidation report is checked to determine whether the address of that datum is in the report. If the address of the datum is in the report at step 218, then the datum is marked invalid at step 220. The items remaining in cache after steps 216 to 220 are executed are presumed to be valid. At step 222, when the report has been processed, the client 20a queries the server for the current value of any datum that is needed and not resident in cache. At step 224, when the client's work is completed, the client 20a may be powered down to the off-line state.

The invalidation reports produced by Broadcasting Addresses (as shown in FIGS. 3A and 3B) do not include any timestamp information for the individual items listed in the report. In between reports, clients 20a–20f that have been continuously on-line assume that any data in cache that are not lifted in the most recently received report are still valid. If any addresses are listed in a report, the clients 20a–20f assume that the data stored at the addresses listed were all updated immediately after the last previous report. This may cause a client 20a to misdiagnose a datum as invalid, increasing the query rate.

For example, consider the case in which the following events occur in order: (1) a server 10a broadcasts a report at time T0 and updates a datum at time T1; (2) the client 20a returns to an on-line state and queries the server for the same datum at time T2; and (3) the server responds to the query at time T3 and issues the next invalidation report at time T4. Even though the client 20a receives the updated value of the datum at T3, upon receipt of the invalidation report at T4, the client assumes that the datum was updated immediately before T4. The client incorrectly diagnoses the copy of the datum received at T3 as invalid.

The situation described above seldom occurs when the clients 20a–20f are on-line nearly all of the time. Furthermore, the first exemplary method, Broadcasting Addresses, has the advantage that the invalidation report may be relatively small, because it only requires an address for each datum. Thus, Broadcasting Addresses may be preferable for continuous and near-continuous client operation.

Figure 4A:
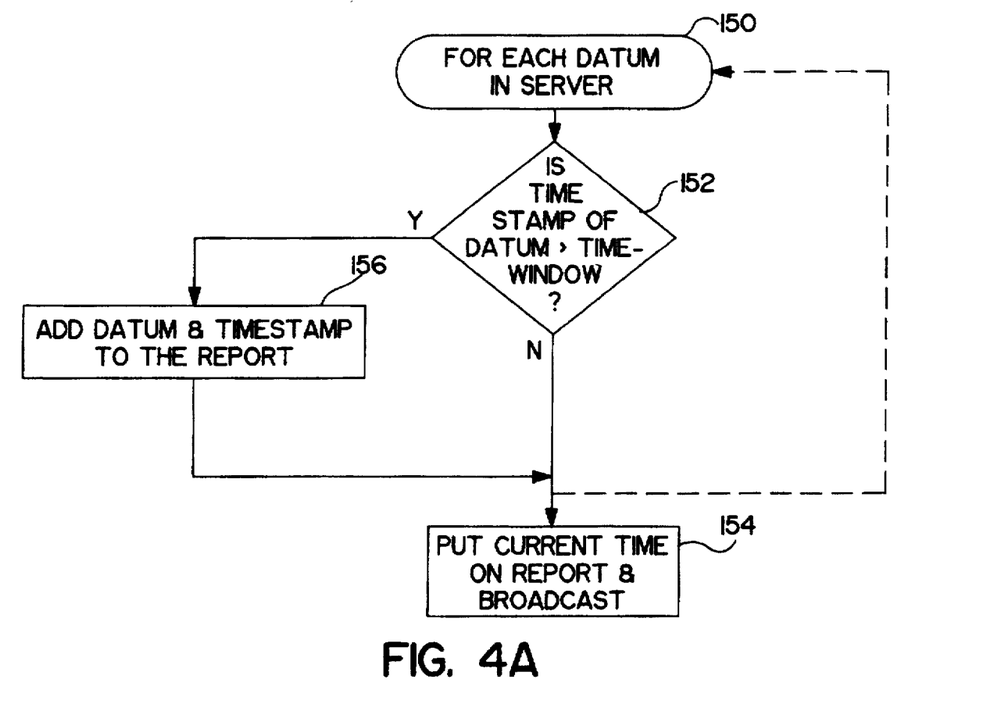
FIG. 4A is a detailed flow chart diagram of a second exemplary method for forming and broadcasting invalidation reports as shown in FIG. 1.
Figure 4B:
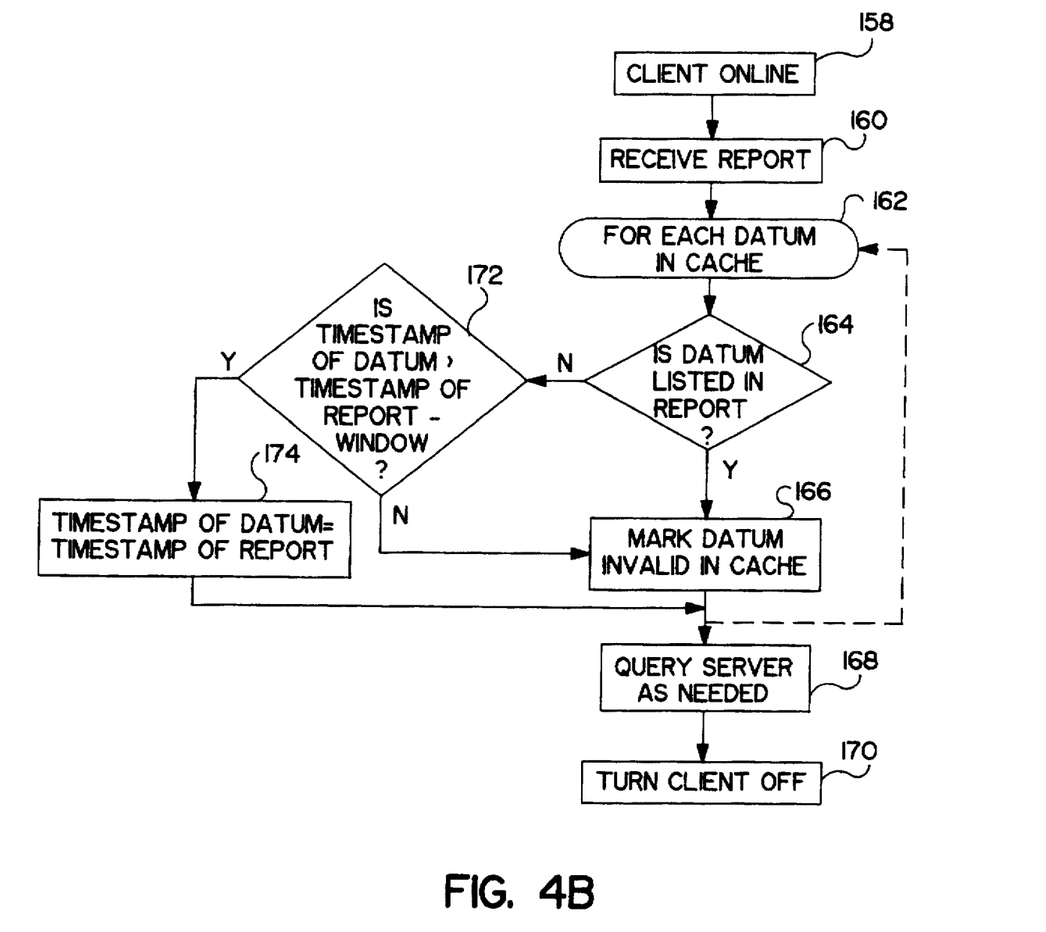
FIG. 4B is a flow chart diagram of an exemplary method for processing the invalidation reports produced by the method shown in FIG. 4A.

The inventors have determined that the throughput for the first exemplary method, in terms of queries responded to by the server per unit of time, may be approximated by equations (1) and (2).

$$T = \frac{L * W - c * b_c}{(b_q - b_a)(1 - h_{at})} \quad (1)$$

$$h_{at} = \frac{(1 - p_o) u_o}{1 - q_o u_o} \quad (2)$$

where:
T=Throughput in responses per second
L=Period between invalidation reports
W=Bandwidth of server-client link
c=Expected number of updates per period equals $n(1 - e^{-\mu L})$
$b_c$=Bytes added to report per updated datum, equal to log(n)
n=number of data in server
$b_q$=Bytes per query
$b_a$=Bytes per answer to query
$h_{at}$=Hit ratio
λ=queries per second
$q_o$=probability of being on line and having no queries in an interval of length L, where $$q_o = (1-s)e^{-\lambda L}$$

s=probability of being disconnected during an interval of length L
$p_o$=probability of no queries during an interval of length L=s+$q_o$
$u_o$=probability of no updates during an interval of length L=$e^{-\mu L}$
μ=changes per datum per second The inventors have determined that the second exemplary embodiment, hereinafter referred to as "Broadcasting Timestamps" may provide better throughput for query intensive environments in which queries are several (e.g., seven or more) orders of magnitude more frequent than updates, and the client processors 20a–20f are on/line a substantial fraction of the time (but not substantially all of the time). This exemplary embodiment is shown in FIGS. 4A and 4B. In this embodiment, both the servers 10a–10d and the clients 20a–20f store timestamps which identify the time at which each respective datum was last updated, as explained in detail below.

FIG. 4A is a flow chart diagram of the method of Broadcasting Timestamps. The server 10a stores a respective timestamp for each respective datum that is included in the common data shared with the other servers 10b–10d and the clients 20a–20f. Each timestamp identifies the time at which the respective datum was most recently updated. At step 150, the server 10a repeats step 152 for each datum. At step 152, the server 10a checks the timestamp of a datum to determine whether the datum was updated within the predetermined time window preceding the execution of step 152. If the datum was updated within the window, then at step 156 the address of the datum and the timestamp of the datum are added to the invalidation report currently being prepared. After steps 152 and 156 (if applicable) are repeated for each datum, at step 154 the server 10a sets a report timestamp in the invalidation report to the current time and broadcasts the report to all clients 20a within its respective cell 12a.

FIG. 4B is a flow chart diagram of the steps executed by the clients 20a–20f to process the invalidation reports produced by the process of FIG. 4A. Step 158 begins the process with the client 20a on-line. The client 20a may have been operating continuously prior to this time, or the client 20a may have just returned to the on-line state. At step 160, the next invalidation report broadcast by the server 10a is received.

Steps 162–166 and 172–174 are repeated for each datum in the cache 22 of client 20a, if applicable. At step 164, the client 20a determines whether the address of the datum is listed in the invalidation report. If so, then at step 166, the datum is marked invalid in the cache 22. If the datum is not listed in the report, then at step 172, the respective timestamp stored in cache and associated with the address of the datum is checked to determine whether the timestamp (i.e., the time that a report was last received by the client) was within the window of time immediately preceding the report. If not, then the client has not processed any reports within the window (e.g., because the client was off-line, because the server failed to issue a report, or because of a communications error), so the datum is presumed to be invalid. In this case, at step 166, the datum is marked invalid in the cache 22.

If at step 172, the timestamp of the datum is within the window preceding the timestamp of the report, then the datum is presumed to be valid, because the server 10a includes in the report the timestamps of all updates that occurred within the window. In this case, at step 174, the timestamp of the datum is changed to the timestamp of the report.

When the above steps have been executed for each datum in the cache, then at step 168 the client 20a queries the server for the current values of any data needed by the client 20a and not resident in the cache 22. When the queries are completed, at step 170 the client 20a may be turned off.

The provision of a window serves several functions. By limiting the earliest time for which the server must include updates in the invalidation reports, the report length is shortened, so that less bandwidth is used in transmitting the reports. A larger fraction of the bandwidth is then available for responding to queries. The size of the queue within the server 10a that maintains the addresses and timestamps of all updated data is also shortened.

The inventors have determined that the throughput for the second exemplary method, in terms of queries responded to by the server per unit time, may be approximated by equations (3) and (4).

$$T = \frac{L * W - n_\omega(\log(n) + b_T)}{(b_q - b_a)(1 - h_{ts})} \quad (3)$$

and $$h_{ts} = \frac{(1 - p_o)u_o}{1 - p_o u_o} - \frac{(1 - p_o)u_o^{k+1}}{1 - q_o u_o} \quad (4)$$

where:

T=Throughput in responses per second
L=Period between invalidation reports
W=Bandwidth of server-client link
ω=Window size in seconds equal to kL, where k is an integer
$n_\omega$=Expected number of updates per window equals $n(1-e^{-\mu\omega})$
$b_T$=Bytes per timestamp
n=number of data in server
$b_q$=Bytes per query
$b_a$=Bytes per answer to query
$h_{ts}$=Hit ratio using time stamps
μ=changes per datum per second
s=probability of being disconnected during an interval of length L
$p_o$=probability of no queries during an interval of length L=s+$q_o$
$u_o$=probability of no updates during an interval of length L=$e^{-\mu L}$ The method of Broadcasting Timestamps may be employed generally without regard to the content or type of data stored in the servers 10a–10d and clients 20a–20f. This is advantageous for systems that share many different databases including respectively different types of data among the processors. In some environments, where only a limited number of data types are present, it may be advantageous to tailor the invalidation reports to the specific type of data being handled. If the invalidation reports are tailored to particular types of data, then the invalidation reports may be compressed.

An example of the use of data compression for Broadcasting Timestamps is in the retail store environment described above, in which the client processors store the prices of a subset of the goods stocked in the store. The goods may be assigned to a predefined set of categories (e.g., meat, canned goods, cleaning products, dairy products, etc.). The invalidation reports may include flags that are set to indicate that the prices of all items in a category (e.g., all meat items) were updated at a given time. It would not be necessary to broadcast the respective timestamp and address of each individual item. Upon receipt of an invalidation report in which a flag is set, the client 20a invalidates all of the data within the category indicated by that flag. This is advantageous in environments in which most or all of the items in a category are likely to be updated at the same time.

Use of data compression reduces the size of the invalidation reports. If the server is either broadcasting invalidation reports or responses to queries most of the time, shortening the reports allows the server to respond to more queries. It is understood by one skilled in the art that a variety of data compression techniques may be used, depending on the nature of the data shared among the processors in the system.

Figure 5A:
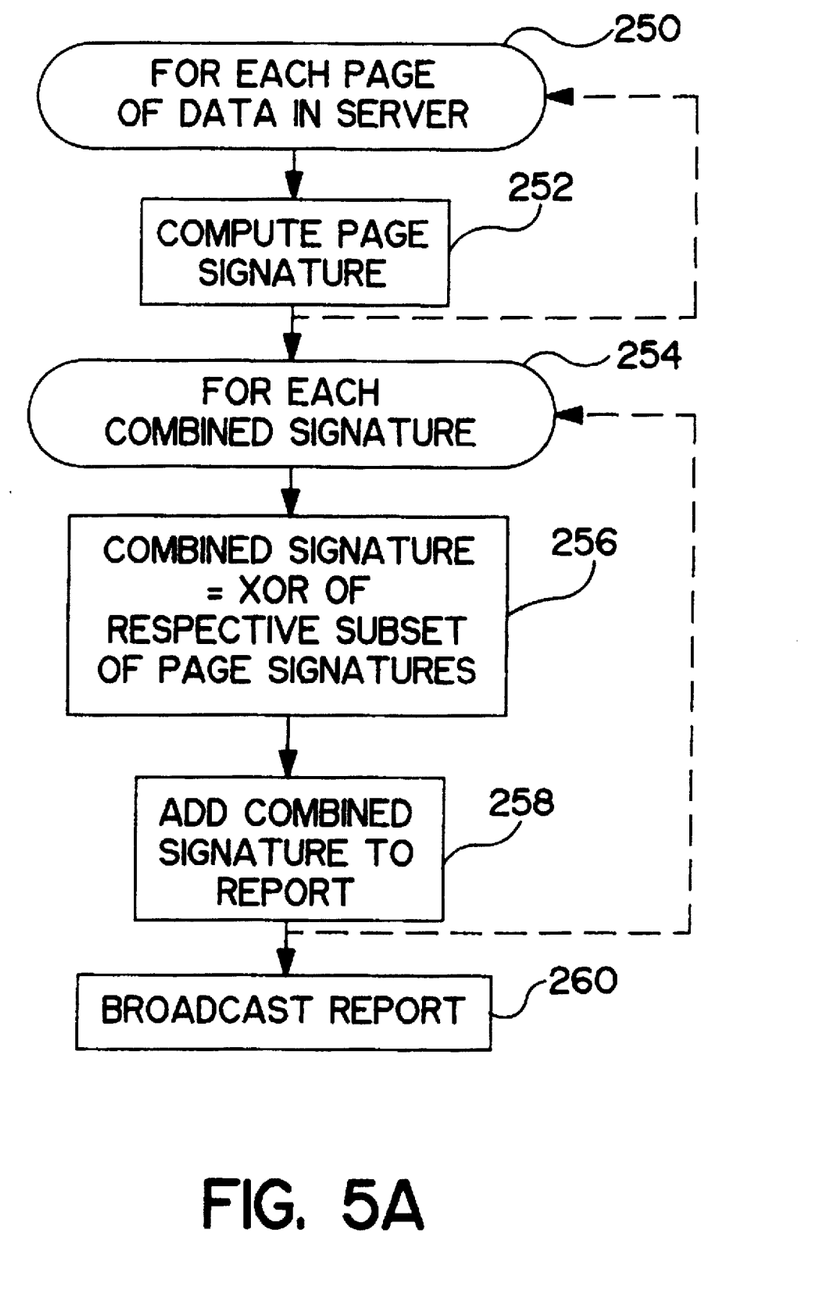
FIG. 5A is a detailed flow chart diagram of a third exemplary method for forming and broadcasting invalidation reports as shown in FIG. 1.
Figure 5B:
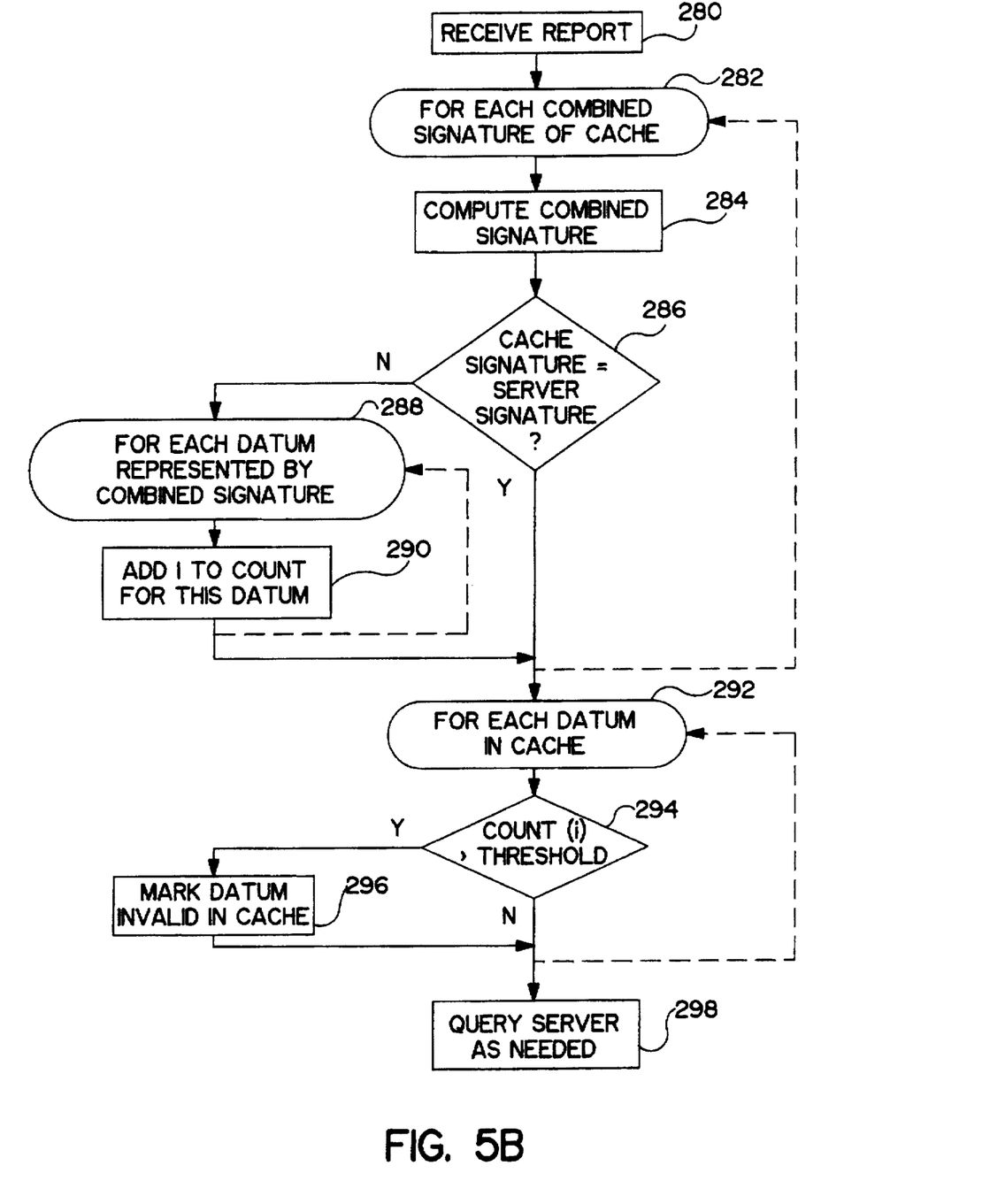
FIG. 5B is a flow chart diagram of an exemplary method for processing the invalidation reports produced by the method shown in FIG. 5A.

The inventors have determined that a third exemplary method according to the invention may provide better throughput when the clients 20a–20f are off-line most of the time. The third method may also provide better throughput when the frequency of queries is a few orders of magnitude greater than the frequency of updates. The third method, hereinafter referred to as "Broadcasting Signatures" involves a comparison between the a first set of signatures based on the contents of the server 10a and a second set of signatures based on the contents of the cache 22 of client 20a. This method is shown in FIGS. 5A and 5B. The invalidation report provides information about the current state of the server 10a.

FIG. 5A is a flow chart diagram showing the process performed by the server to generate the invalidation reports. Signatures are checksums computed over the values of data in the server. At steps 250 and 252, the data in the server are divided into pages, and a signature is computed for each page, forming a complete set of individual page signatures. At steps 254–258, the combined signatures are formed. At step 256, a subset of the individual signatures are combined to form a combined signature by forming the Exclusive OR (XOR) of the subset of individual signatures. At step 258, the combined signature is added to the report. By repeating steps 256 and 258, a plurality of different subsets (each including the individual signatures from a respectively different subset of the pages) are thus combined to form a plurality of combined signatures. At step 260, the report is broadcast to the clients 20a–20f.

FIG. 5B is a flow chart diagram of the signature processing performed by the clients 20a–20f. At step 280, the client 20a receives the invalidation report from the server 10a. The clients 20a–20f typically do not include copies of all of the server's data in cache 22. Only some of the subsets of the pages in the server 10a are copied in each cache. Steps 282–290 are repeated for each respective subset of the server pages stored in the cache 22 (each subset corresponding to a respective combined signature). At step 284, the client 20a performs a process similar to steps 250 to 256 (performed by the server 10a, as shown in FIG. 5A). The client 20a computes an individual signature for each page in the cache 22, and forms the combined signatures (as the Exclusive OR of a subset of the individual signatures). The client 20a only computes combined signatures for the subsets of the data that are of used by the client 20a.

The composition of the combined signatures broadcast in the invalidation reports by the server is statically defined, so that each client recognizes the format of the reports, and each client is able to identify those combined signatures that are relevant to the pages copied in its cache 22. At step 286, the client 20a compares its combined signature to the combined signature received in the invalidation report. A publication by D. Barbara and R. J. Lipton, "A Class of Randomized Strategies for Low-Cost Comparison of File Copies", IEEE Transactions on Parallel and Distributed Systems, Vol. 2, No. 2, pages 160–170, 1991, is hereby incorporated by reference for its teachings on techniques for generating combined signatures for data comparisons.

If, at step 286, a combined signature in a report is equal to the respective combined signature in the cache 22, the probability that one or more items covered by the combined signature are different from one another (i.e., the copy of the data in cache is invalid) but have the same signature is approximately $2^{-s}$, where s is the number of bits in the combined signature. Thus, there is a known probability that an item may not be invalidated in the cache 22 in response to the invalidation report. This probability may be limited to a desired value by selecting an appropriate number of bits for the combined signature.

If, at step 286, a combined signature in the report is different from the corresponding combined signature in the cache 22, then one or more of the data covered by that combined signature have been updated in the server 10a. In order to detect which of the data in cache are actually invalid, several respectively different combined signatures (representing respectively different subsets of the data in the server) are included in the report. Each page in the cache may be included in several different subsets of the pages in the server, and each page is thus covered by several combined signatures. Steps 288 and 290 are repeated for each datum in each page represented by the non-matching combined signature. At step 290, a counter for each datum represented by the combined signature is incremented.

When steps 282 to 290 have been repeated for each subset of the pages in cache, then steps 292 to 296 are repeated for each datum in cache. The number of non-matching combined signatures associated with each respective datum is determined by the value of the respective counter for that datum. At step 294, if the number of non-matching signatures for a datum exceeds a predetermined threshold level, then at step 296, the datum is determined to be invalid and is marked invalid. When steps 292–296 have been repeated for each datum in cache, at step 298 the client 20a may query the server 10a for any data that are required and not resident in cache 22.

As described above, the respective counters for each respective datum in a page of the cache all have the same value, even though as few as one datum may actually have been updated. This means that an update to one datum causes all other data in the same page as the updated datum to be invalidated in the cache 22 of the client 20a. The page size may be made arbitrarily small (even a single datum per page), to minimize the number of data that are unnecessarily invalidated in this manner. The tradeoff is that, as the page size becomes smaller, the number of pages becomes greater.

The state based method of Broadcasting Signatures is different from Broadcasting Addresses (FIGS. 3A and 3B) and Broadcasting Timestamps (FIGS. 4A and 4B), both of which are history based (i.e., transactional). Because each invalidation report containing signatures provides information regarding all data in the server 10a, the client 20a can determine whether each datum in its cache 22 is invalid, even if the client 20a has returned to an on-line state after missing several invalidation reports.

By Broadcasting Signatures, the client 20a need not invalidate all of the items in cache 22 if the off-line time exceeds a predetermined "window", as in Broadcasting Timestamps. (In this sense, Broadcasting Signatures functions as if a window of infinite duration is used). Thus, Broadcasting Signatures may provide better throughput in an environment in which the clients are off-line a substantial fraction of the time. Furthermore, if the ratio of queries to updates is not very high (e.g., 1,000 to 1), the average report size for Broadcasting Timestamps becomes larger as more items are invalidated, reducing throughput by that method. This factor makes Broadcasting Signatures advantageous when the frequency of queries is not several orders of magnitude greater than the frequency of updates.

In the exemplary embodiment, there are m randomly chosen (a priori, before any exchange of signatures occurs) sets of data. The members of each set are randomly chosen so that a datum has the probability 1/(1+f) of being included in each set (where f is the number of different pages).

The inventors have determined that the throughput for Broadcasting Signatures according the third exemplary embodiment of the invention, in terms of queries responded to by the server per unit time, may be characterized by equations (5) to (8).

$$T = \frac{L*W - 6*s*(f+1)\left[\ln\left(\frac{1}{\delta}\right) + \ln(n)\right]}{(b_q + b_a)(1 - h_{sig})} \quad (5)$$

$$m \geq 6*(f+1)*\left[\ln\left(\frac{1}{\delta}\right) + \ln(n)\right] \quad (6)$$

$$h_{sig} = [1 - p(N_s)] * \frac{(1-p_o)u_o}{(1-p_o u_o)} \quad (7)$$

$$p(N_s) = \frac{1}{1+f} * \left(1 - \frac{1}{e}\right) \quad (8)$$

where:
T=Throughput in responses per second
L=Period between invalidation reports
W=Bandwidth of server-client link
S=Number of bits in combined signature
f=Number of different pages
δ=Threshold maximum probability that a valid datum in cache is falsely diagnosed
n=number of data in server
$b_q$=Bytes per query
$b_a$=Bytes per answer to query
$h_{sig}$=Hit ratio using time stamps
m=Number of combined signatures in the invalidation report
p($N_s$)=Probability of a valid datum being represented by a non-matching signature
μ=changes per datum per second
$P_o$=probability of no queries during an interval of length L=s+$q_o$
$u_o$=probability of no updates during an interval of length L=$e^{-\mu L}$ The method of Broadcasting Signatures is more effective when there are relatively few differences between the data in the server 10a and the data in the client 20a. This condition is present if the product of the average time a client is taken off-line multiplied by the frequency of updates is not very large.

If however, there are several updated data distributed among many different pages, these updated data may affect a large fraction of the combined signatures. This is because of the way each page is randomly assigned to several subsets for forming the respective combined signatures for each subset. In this case, with data differences in a large number of pages that are reflected in an even larger number of combined signatures, many data in the client's cache may be invalidated.

The method of Broadcasting Signatures may provide better throughput than Broadcasting Addresses or Broadcasting Timestamps in the mobile wireless computing environment, because limited battery capacity and the costs of maintaining a lengthy session over a cellular communications link make it advantageous to keep palmtop computers off-line when possible. Furthermore, Broadcasting Signatures may provide better throughput than Broadcasting Timestamps in situations in which the query rate only exceeds the update rate by a few orders of magnitude.

It is understood by one skilled in the art that many variations of the embodiments described herein are contemplated. While the invention has been described in terms of exemplary embodiments, it is contemplated that it may be practiced as outlined above with modifications within the spirit and scope of the appended claims.

What is claimed:

1. A method for maintaining coherency between a server processor that stores a plurality of data values and a plurality of client processors across a communications network, each of the client processors having a cache memory for storing a respective subset of the plurality of data values, comprising the steps of:

(a) broadcasting a single invalidation report from the server processor across the communications network to each of the plurality of client processors, periodically, each periodic invalidation report including information identifying any of the plurality of data values that have been updated within a predetermined period of time before the server processor broadcasts the invalidation report;

(b) determining, based on the single invalidation report, whether a selected data value in the cache memory of each respective client processor has been updated in the server processor since the selected data value was stored in the respective cache memory, the determining performed by each respective client processor based on a respective copy of the single invalidation report received by that client processor; and (c) Invalidating the selected data value in the cache memory of each respective one of the plurality of client processors having the selected data value stored in the cache thereof, if the client processors determine that the selected data value has been updated in the server processor, thereby maintaining coherency without requiring information in the server identifying in which of the plurality of client processors each of the plurality of data values are stored.

2. A method according to claim 1, wherein the predetermined period of time is greater than the period between the broadcasting of successive invalidation reports.

3. A method according to claim 2, wherein the step of broadcasting an invalidation report includes listing a plurality of timestamps, each timestamp reflecting a respective time when a respectively different data value was most recently updated.

4. A method according to claim 1, wherein the step of broadcasting an invalidation report includes listing a plurality of identifiers, each identifier identifying an address of a respective data value that has been updated since the last invalidation report was broadcast.

5. A method according to claim 1, further comprising the steps of:

(d) taking one of the plurality of client processors off-line;

(e) returning the one client processor to an on-line state; and (f) invalidating any of the data in the cache memory that the one client processor determines to be invalid based on the next invalidation report broadcast by the server processor after step (e).

6. A method according to claim 1, further comprising the steps of:

(d) taking one of the client processors off-line;

(e) moving the one client processor to a location at which the one client processor communicates with a further server processor, the further processor communicating with the server processor for receiving a copy of the plurality of data values from the server processor;

(f) returning the one client processor to an on-line state;

(g) broadcasting an invalidation report from the further server processor;

(h) invalidating any of the data values in the cache memory that the one client processor determines to be invalid based on the invalidation report broadcast by the further server processor.

7. A method according to claim 1, wherein step (a) includes broadcasting the single invalidation report to every one of the plurality of client processors regardless of whether the individual client processors have copies of the data values identified in the single invalidation report.

8. A system for maintaining coherency within a communications network, between a server processor that stores a plurality of data values and a plurality of client processors across the communications network, each of the client processors having a cache memory for storing a respective subset of the plurality of data values, comprising:

means within the server processor for forming and broadcasting a single invalidation report across the communications network to each of the plurality of processors, periodically, each periodic invalidation report including information identifying any of the plurality of data values that have been updated within a predetermined period of time before the server processor broadcasts the invalidation report;

means within each of the client processors for determining, based on a respective copy of the single invalidation report received by that client processor, whether a selected data value in the respective cache memory of the client processor has been updated in the server processor since the selected data value was stored in the respective cache memory; and means within each of the client processors responsive to the determining means for invalidating the selected data value in the cache memory of each respective one of the plurality of processors having the selected data value stored in the cache thereof, if the selected data value has been updated in the server processor, thereby maintaining coherency without requiring information in the server identifying in which of the plurality of client processors each of the plurality of data values is stored.

9. A system according to claim 8, wherein the server processor is a fixed location mobile unit support station.

10. A system according to claim 9, wherein the one client processor is a palmtop computer.

11. A system according to claim 8, wherein the forming and broadcasting means broadcast the single invalidation report to every one of the plurality of client processors regardless of whether the individual client processors have copies of the data values identified in the single invalidation report.

* * * * *